July 8, 1952  H. PETERSON  2,602,420
ANIMAL FEEDER
Filed May 3, 1950

Inventor
Hal Peterson
By Wilfred E. Lawson
Attorney

Patented July 8, 1952

2,602,420

UNITED STATES PATENT OFFICE 2,602,420

ANIMAL FEEDER

Hal Peterson, Kerrville, Tex.

Application May 3, 1950, Serial No. 159,809

1 Claim. (Cl. 119—53)

This invention relates to a barnyard feeder for fowl, hogs and the like and more particularly to a device of this kind of a portable type and it is an object of the invention to provide a feeder which can be used for a long period of time without replenishing and thus materially reducing cost and labor in servicing.

It is also an object of the invention to provide a device of this kind of a portable type and which may be moved from one desired feeding location to another ready for operation without requiring any mechanical changes.

Furthermore, it is an object of the invention to provide a feeder whereby constant flow of feed is assured to the feeding area to compensate for the feed consumed.

A still further object of the invention is to provide a feeder wherein is provided a gravity controlled feed level to allow the device to include a supply hopper or bin of considerable capacity.

An additional object of the invention is to provide a feeder including a storage or supply area of a character to prevent moisture and other foreign matter to be admitted therein and thus eliminating mold caking conditions or other condition which might interfere with the desired gravity flow of feed to the feeding area.

The invention consists in the details of construction and in the combination and arrangement of the several parts of my improved barnyard feeder whereby certain advantages are attained, as will be hereinafter more fully set forth.

Figure 1:
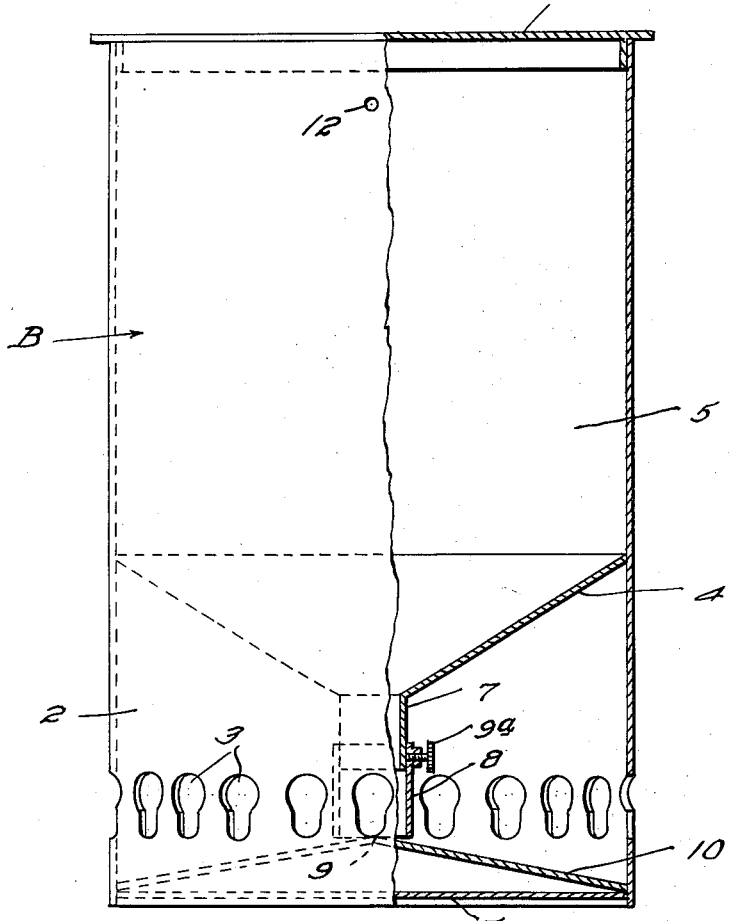
Figure 2:
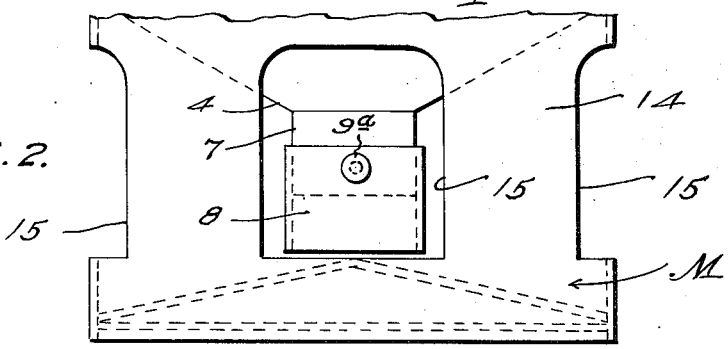

In order that my invention may be better understood, I will now proceed to describe the same with reference to the accompanying drawings, wherein:

Figure 1 is a view partly in section and partly in elevation illustrating a feeder constructed in accordance with an embodiment of the invention; and Figure 2 is a fragmentary elevational view of a modification.

In the embodiment of the invention as illustrated in the accompanying drawings, B denotes a cylindrical body of required dimensions and which has its lower end closed by a bottom wall 1. The side wall 2 of the body B at a predetermined distance above but in relatively close proximity to the bottom wall 1 is provided therearound with circumferentially and equidistantly spaced feed openings 3 herein set forth as of a buttonhole type disposed lengthwise of the body B with the larger end of each opening 3 upwardly directed.

Intersecting the interior of the body B and at a short distance above the openings 3 is a funnel type partition comprising the portion 4 having its apex downwardly disposed. The portion of the interior of the body B above the partition 4 constitutes a hopper or storage chamber 5 of considerable capacity, preferably sufficient to hold sufficient grain for several days feeding.

The partition 4 serves as the floor for the hopper or compartment 5 and the low or apex portion thereof is open to provide a discharge for the feed and this discharge is defined by a depending spout 7. The lower extremity of the spout 7 is snugly engaged by a second sleeve 8 adjustable lengthwise along the spout 7 to vary the distance desired by the lower end of the sleeve 8 and the apex or high 9 of a conical false or supplemental bottom 10 intersecting the body B and resting upon the bottom wall 1 thereof. The sleeve 8 is held in selected adjustment by the binding screw 9a carried thereby and engaging the spout 7. The high point 9 of the bottom 10 is substantially in the same plane as the lower ends of the openings 3.

The top of the body B is open to allow the desired filling of the hopper or chamber 5 and is closed by a lid 11 of a slip type and which lightly engages within the top portion of the body B and is sealed against entry within the hopper or chamber 5 of moisture or other foreign matter which might result in molding or caking of the grain within the hopper or chamber 5 or otherwise interfere with the gravity discharge flow of the grain through the spout 7 and sleeve 8 as the grain is consumed in the feeding area within the body B below the sleeve 8 and adjacent to the side wall 2.

The amount of flow of grain out from the hopper or chamber 5 may be regulated or controlled by required adjustment of the sleeve 8 away from or toward the apex portion of the bottom 10.

It is also believed to be apparent that the device as herein comprised is one which may be readily moved from one feeding location to another and ready for operation without requiring any mechanical changes.

The side wall 2 of the body B in the upper portion thereof is provided with a small vent opening 12 to facilitate the flow of the grain from the hopper or chamber 5 while the lid or cover 11 is applied.

The embodiment of the invention as illustrated in Figure 2 is intended for use in the feeding of hogs and the like. As shown in this figure the body member M is provided in the lower portion of the side wall 14 thereof with the large feeding openings 15 through which hogs or other stock may have access to the feed area within the member M. The inner construction or assembly is the same as hereinbefore described with respect to the invention as embodied in Figure 1.

From the foregoing description it is thought to be obvious that a barnyard feeder constructed in accordance with my invention is particularly well adapted for use by reason of the convenience and facility with which it may be assembled and operated.

I claim:

A gravity feeder comprising an elongate, upright receptacle including a side wall and a bottom wall, the side wall in its lower portion being provided with a circumferentially extending series of feeding openings, the bottoms of said openings lying in a common plane above the bottom wall, a funnel form partition intersecting the body above the openings and having a downwardly directed discharge spout, the interior of the body above the partition constituting a supply chamber for feed, a sleeve encircling the spout and depending from and slidably mounted on the spout, means for holding the sleeve in a position of adjustment on said spout, a low conical wall resting upon said bottom wall and having its apex at the said plane of the bottoms of the openings, and said sleeve being adapted to be positioned on the spout with said apex projecting thereinto whereby the bottom edge of the sleeve may be brought into close proximity to the top of the conical wall.

HAL PETERSON.

REFERENCES CITED

The following references are of record in the file of this patent:

UNITED STATES PATENTS

| Number | Name | Date |
|---|---|---|
| 570,569 | Smith | Nov. 3, 1896 |
| 1,108,019 | Strickler | Aug. 18, 1914 |
| 1,485,469 | Riegel | Mar. 4, 1924 |
| 1,537,337 | De Angulo | May 12, 1925 |

FOREIGN PATENTS

| Number | Country | Date |
|---|---|---|
| 79,753 | Germany | Feb. 20, 1895 |